Dec. 7, 1965   C. BELSKY   3,222,101
VEHICLE BODY CORNER PILLAR CONSTRUCTION
Original Filed May 21, 1962

CHARLES BELSKY
INVENTOR
BY John R. Faulkner
John J. Boethel
ATTORNEYS

# United States Patent Office 3,222,101
Patented Dec. 7, 1965

3,222,101
VEHICLE BODY CORNER PILLAR
CONSTRUCTION
Charles Belsky, Detroit, Mich., assignor to Ford Motor
Company, Dearborn, Mich., a corporation of Delaware
Original application May 21, 1962, Ser. No. 196,101, now
Patent No. 3,155,420, dated Nov. 3, 1964. Divided
and this application Apr. 14, 1964, Ser. No. 359,665
1 Claim. (Cl. 296—28)

This invention relates generally to motor vehicles and more specifically to an improved body construction for motor vehicles.

This application is a division of copending application Serial No. 196,101, filed May 21, 1962, now U.S. Patent No. 3,155,420 issued November 3, 1964.

In conventional motor vehicle body construction, the structural support between the forward corner portion of the roof and the cowl structure comprises a pillar or post. At its side facing forwardly of the vehicle, the pillar has interlocking engagement with a weather strip or sealing strip which is mounted on the periphery of the vehicle windshield. At its side facing rearwardly of the vehicle, the pillar defines a portion of the body opening for the vehicle door. The portion of the vehicle door adjacent the pillar generally comprises a leg of a vent window supporting framework. A weather strip or sealing strip is interposed between the pillar surface and the opposing surface of the vent window frame leg. This weather strip may be mounted on either the pillar surface or the frame leg surface. Another weather strip is interposed between the frame leg and the opposing edge of the vent window glass, this latter weather strip being mounted on the surface of the frame leg. The windshield weather strip, pillar, door weather strip, vent window frame and vent window seal are positioned generally in substantially longitudinal alignment. This results in an opaque wall at the forward corner of the vehicle passenger compartment. This wall undesirably obstructs the field of vision of the vehicle operator.

The present invention provides an improved construction and arrangement of a vehicle body in which the longitudinal extent of the opaque corner wall is materially reduced without affecting the requisite structural rigidity of the windshield pillar or the sealing characteristics of the various weather seals. This is accomplished by the outboard relocation of the vent window frame leg so that it is contiguous and complementary to the offset provided in the structural member forming the windshield pillar. This permits the vent window frame leg to be positioned in lateral relationship to the pillar when the vehicle door is closed rather than in the conventional longitudinal relationship. This also allows the placing of the weather strips in sealing relationship between opposed lateral surfaces of the pillar and frame leg rather than between opposed end faces as in conventional structures.

The result is a substantial reduction in cross sectional area of the pillar and associated weather strips, thereby providing an improved field or vision at the forward corners of the passenger compartment.

Other objects and advantages of this invention will be made more apparent as this description proceeds, particularly when considered in connection with the accompanying drawings, wherein.

Figure 1:
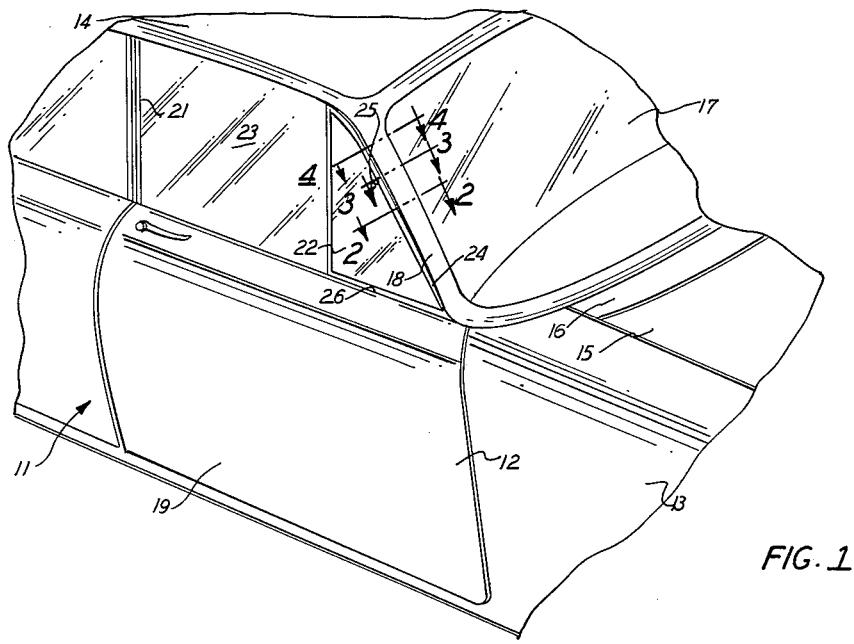
FIGURE 1 is a perspective view of a portion of a motor vehicle body incorporating one embodiment of the present invention.

Referring to the drawing and in particular to FIGURE 1 there is shown a motor vehicle body 11 having a front door 12, a front side panel 13, a roof structure 14, a hood 15 and an upper cowl structure 16. A curved windshield 17 is supported at the top and bottom by the roof panel and the upper cowl structure 16, respectively. Also, the windshield 17 is supported by a pair of windshield pillars or posts 18 at opposite sides of the vehicle with the right one of the windshield pillars or posts 18 being shown in FIGURE 1. The front door 12 has a lower door structure 19 which includes a forward portion offset forwardly of the windshield pillar 18 and connected by hinges (not shown) at its forward edge to the adjacent body structure. A fixed frame 21 extends upwardly from the lower door structure 19 and provides support for a pivotable vent window 22 and a vertical slidable window 23. The fixed frame 21 has a vent window supporting frame member 24 substantially parallel with and adjacent the rearwardly facing edge of the windshield pillar post 18. The vent window 22 is pivotally supported by a first pivot 25 attached to the vent window support frame member 24 and a second pivot 26 attached to the lower door structure 19 to permit the manual swinging movement of the vent window 22 to an opened position.

Figure 2:
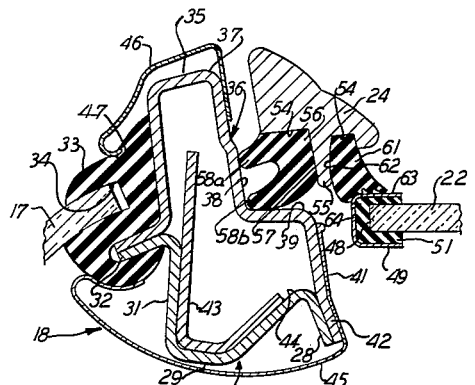
FIGURE 2 is an enlarged vertical cross sectional view lying substantially on the plane indicated by line 2—2 of FIGURE 1.

As seen in FIGURE 2, the windshield pillar comprises a hollow structural member 27 which is formed from a steel strip having overlapping portions welded together to form an inwardly extending flange 28. The hollow structural member 27 has an inwardly facing surface 29 which is substantially flush with the terminal end of the flange 28. On the forwardly facing surface 31 of the hollow structural member 27 there is shown a second flange 32 to which a weather strip 33 is securely attached. This weather strip 33 has a recess 34 to receive the side edge of the wrap-around windshield 17. The outer facing surface 35 of the hollow structural member 27 is substantially reduced in width by an offset, generally designated as 36, which begins at the rearward outer edge 37 of the windshield pillar 18. This offset 36, which extends inwardly from the outer edge 37, is substantially L-shaped and is defined by a rearwardly facing inner surface 38 and an outwardly facing inner surface 39. The outwardly facing surface 39 of the offset 36 is approximately halfway between the outer edge 37 and the inwardly facing surface 29 of the hollow structural member 27. From the offset 36 the rearwardly facing surface 41 of the hollow structural member 27 continues until it terminates in a flange portion 42 which is joined with the beginning of the metal strip.

An L-shaped reinforcing member 43 is attached to the inside surfaces 44 of the hollow structural member 27 to provide additional rigidity for the windshield pillar post 18.

The hollow structural member may be decoratively trimmed by an interior molding strip 45 of a generally arcuate cross section which is attached at one end to the rearwardly facing surface 41 of the hollow structural member 27 and at the other end to the windshield weather strip 33. A second molding strip 46 may be provided to conceal the outer facing surface 35 of the hollow structural member 27. One end of the second molding strip 46 is clamped to a portion of the rearwardly facing inner surface 38 of the offset 36 and the other end is received by a groove 47 in the windshield weather strip 33.

The vent window supporting frame member 24 defining one edge of the fixed frame 21 is substantially received within the offset 36 and is in a contiguous and complementary relationship to the offset 36 at the outer edge 37 of the windshield pillar 18 when the door 12 is in the closed position as shown in the drawing.

The vent window 22 is longitudinally spaced rearwardly from the hollow structural member 27 and laterally spaced inwardly from the vent window supporting frame member 24. The vent window 22 has a forward edge portion 48 which is held in a frame channel 49 with a sealing strip 51 interposed between the frame channel 49 and the glass plate.

Figure 3:
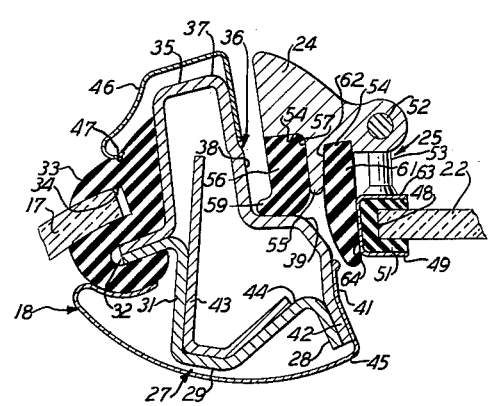
FIGURE 3 is an enlarged cross sectional view taken substantially on the plane indicated by line 3—3 of FIGURE 1; and, FIGURE 4 is an enlarged cross sectional view taken substantially on the plane indicated by line 4—4 of FIGURE 1.

In FIGURE 3 is seen a section through the first pivot 25 detailing the pivotal support for the vent window 22. This first pivot 25 comprises a pivot pin 52 to which one end of a pivot arm 53 is attached while the other end of the pivot arm 53 is directly secured to the vent window frame channel 49. The pivotal arrangement permits the forward edge portion 48 of part of the pivotable vent window 22 above the first pivot 25 to move outwardly while part of the vent window 22 below the first pivot 25 moves in an inward direction when the vent window 22 is manually swung to its exhaust position.

Figure 4:
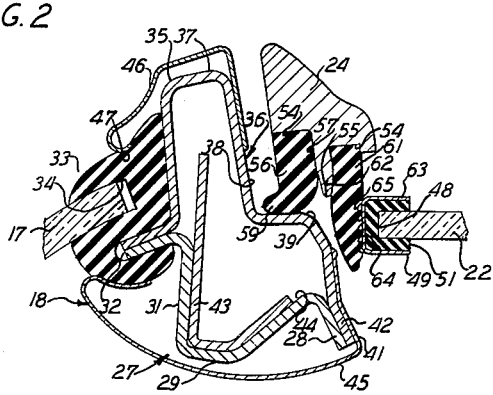

As seen in FIGURES 2 through 4, the vent window supporting frame member 24 has its inwardly facing surface 54 bisected by a projection 55 extending inwardly therefrom. The projection 55 is relatively small and permits the entire vent window supporting frame member 24 to be contiguous to the offset 36 at the outer edge 37 of the hollow structural member 27. A substantially vertically extending weather strip 56, which may be formed from a spongy cellular sealing material, is attached to the forward face 57 of the projection 55. As best seen in FIGURE 2, this weather strip 56 has two inwardly extending lips 58 below the first pivot 25 with one lip 58a in contact with the rearwardly facing inner surface 38 of the offset 36 and the other lip 58b in sealing contact with the outwardly facing inner surface 39 of the offset 36.

Above the first pivot 25, best seen in FIGURE 3, only one lip 59 is provided which is in sealing contact with the offset 36 of the hollow structural member 27. A second weather strip 61, which is affixed to the rearward face 62 of the projection 55 provides sealing contact with the outward face 63 of the vent window frame channel 49 below the first pivot 25 as seen in FIGURE 2 and with the forward face 64 of the vent window frame channel 49 above the first pivot 25 as seen in FIGURES 3 and 4. The second weather strip 61 is formed from a relatively hard sealing material which may be provided with teeth portions 65 at preselected areas. These teeth portions 65 are relatively flexible and therefore provide a better sealing contact between the selected portions of the weather strip 61 and the vent window frame channel 49.

From the foregoing it will be seen that the hollow structural member 27 for the windshield pillar post of this invention is substantially reduced in cross section due to the outboard relocation of the vent window supporting frame member 24 so that it is contiguous and complementary to the offset 36 at the outer edge of the hollow structural member 27 when the door structure 19 is in a closed position.

The sealing of the spaces between the vent window supporting frame member 24, the windshield pillar post 18, and the vent window 22 when the door 12 and vent window 22 are in a closed position is accomplished by two separate weather strips 56 and 61 which results in a substantial maintenance advantage for the owner of the vehicle. The first weather strip 56, which is made from a spongy cellular sealing material to meet engineering requirements, quite frequently needs replacement due to pressure exerted on it by the relatively sharp edge of the door 12. The second weather strip 61 is relatively stationary and not subjected to the shear stresses of the first weather strip 56. Therefore, the second weather strip 61 can be fabricated from a mechanical hard rubber material which is less prone to failure. The use of flexible teeth portions 65 provides a firm sealing contact without sacrificing any of the sealing characteristics of a mechanical hard rubber weather strip. It can be seen that the first weather strip 56 may be replaced without requiring removal of the second weather strip 61.

It will be understood that the invention is not to be limited to the exact construction shown and described but that various changes and modifications may be made without departing from the spirit and scope of the invention as defined in the appended claim.

I claim:

In a vehicle body construction, a door mounted for movement to an opened or closed position, a windshield pillar comprising a generally upright hollow structural member having a rearwardly facing surface and an inwardly facing surface, said rearwardly facing surface having an offset beginning at its outer edge, said offset being defined by a rearwardly facing inner surface beginning at the outer edge and an outwardly facing inner surface intermediate the outer edge and said inwardly facing surface of said structural member, a vent window supporting frame member attached to said door, said supporting frame member in a door closed position being in a contiguous relationship to said rearwardly facing inner surface of said offset at the outer edge of said pillar, said supporting frame member having an inwardly facing surface, said inwardly facing surface of the supporting frame member being laterally outwardly spaced from said outwardly facing inner surface of the offset when said door is in a closed position, a vent window, means pivotally connecting said vent window to said supporting frame member for movement between opened and closed positions, said vent window being longitudinally spaced rearwardly from said hollow structural member and laterally inwardly from said supporting frame member, and a first weather strip extending in a generally upright direction and affixed to the inwardly facing surface of said support frame member, said first weather strip having a first portion with two inwardly extending lips below the pivotal connection and a second portion with one inwardly extending lip above said pivotal connection, one of said lips of said first portion being in sealing contact with said rearwardly facing inner surface of said offset, the second of said two lips of said first portion being in sealing contact with said outwardly facing inner surface of said offset, the lip of said second portion being in sealing contact with one of said inner surfaces of said offset, and a second weather strip affixed to the inwardly facing surface of said support member, said second weather strip being longitudinally rearwardly spaced from said first weather strip, said second weather strip being in sealing contact with said vent window when said vent window and said door are in closed positions.

References Cited by the Examiner
UNITED STATES PATENTS

| | | | |
|---|---|---|---|
| 2,456,175 | 12/1948 | Coppock et al. | |
| 2,563,221 | 8/1951 | Doty et al. | 296—28 |
| 3,002,783 | 10/1961 | Hofmeister | 296—44 |

BENJAMIN HERSH, *Primary Examiner.*

A. HARRY LEVY, *Examiner.*